United States Patent [19]
Trehus

[11] Patent Number: 5,845,087
[45] Date of Patent: *Dec. 1, 1998

[54] INTERNETWORK ZONE NAME FILTERING WITH SELECTIVE PLACEBO ZONE NAME SUBSTITUTION IN A RESPONSE TO A REQUEST FOR ZONE NAME INFORMATION

[75] Inventor: Eric M. Trehus, San Jose, Calif.

[73] Assignee: Telebit Corporation, Chelmsford, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 610,474

[22] Filed: Mar. 4, 1996

[51] Int. Cl.⁶ ....................................................... G06F 15/16
[52] U.S. Cl. .............................. 395/200.72; 395/200.53; 395/200.79; 370/401; 340/825.8
[58] Field of Search ..................................... 370/400, 401, 370/463, 402, 403, 404, 405, 408; 395/200.53, 200.68, 200.72, 200.79; 340/825.05, 825.79, 825.8

[56] References Cited

U.S. PATENT DOCUMENTS

| | | | |
|---|---|---|---|
| 5,282,270 | 1/1994 | Oppenheimer et al. | 395/200.53 |
| 5,327,426 | 7/1994 | Dolin, Jr. et al. | 370/235 |
| 5,410,543 | 4/1995 | Seitz et al. | 370/463 |
| 5,530,703 | 6/1996 | Liu et al. | 370/312 |
| 5,570,366 | 10/1996 | Baker et al. | 370/312 |
| 5,751,971 | 5/1998 | Dobbins et al. | 395/200.68 |

OTHER PUBLICATIONS

WebTrack (Infoworld), Jul. 10, 1995.
*Router Products Configuration Guide,* Cisco Systems, Inc., Release 11.0, pp. 15–10 through 15–19, Copyright 1995.
G. Sidhu et al., *Inside AppleTalk®,* 2nd ed., Chapter 5 pp. 5–1 thru 5–26, Chapter 7 pp. 7–1 thru 7–17 and Chapter 8 pp. 8–1 thru 8–25, (1990).
*Routing AppleTalk,* Cisco Systems, Inc. Manual, Chapter 10 pp. 10–1 thru 10–89, (undated).

*Primary Examiner*—Parshotam S. Lall
*Assistant Examiner*—Gautam R. Patel
*Attorney, Agent, or Firm*—Weingarten, Schurgin, Gagnebin & Hayes LLP

[57] ABSTRACT

A zone filtering method and apparatus, finding particular utility in an AppleTalk (trademark of Apple Computing, Inc.) internetwork, is disclosed. A network manager is able to hide zones and respective Network Visible Entities (NVE's) from nodes (routers and workstations) on branches of the AppleTalk internetwork through the use of zone filters. These nodes are thus unable to initiate communication with NVE's within the hidden zones. A zone filter is a list of zone names and an indication of whether access to the listed zones is permitted or denied. The port to which a zone filter is attached identifies which branch of the AppleTalk internetwork the zone filter applies to. A router according to the invention is capable of recognizing specific datagrams to which the zone filter is applied.

8 Claims, 3 Drawing Sheets

| NETWORK RANGE | DISTANCE | PORT | NEXT IR | ENTRY STATE |
|---|---|---|---|---|
| 30-40 | 2 | 2 | B | GOOD |
| 100-100 | 1 | 2 | B | GOOD |
| 2-5 | 2 | 2 | B | GOOD |
| 5000-5500 | 0 | 2 | 0 | GOOD |
| 3000-3500 | 0 | 3 | 0 | GOOD |

*FIG. 3*

INTERFACE

*FIG. 4*

INTERNETWORK ZONE NAME FILTERING WITH SELECTIVE PLACEBO ZONE NAME SUBSTITUTION IN A RESPONSE TO A REQUEST FOR ZONE NAME INFORMATION

FIELD OF THE INVENTION

The present invention relates to AppleTalk internetwork zone filtering, and in particular to filtering a zone or zones from selected branches in an AppleTalk internetwork.

BACKGROUND OF THE INVENTION

Internetwork zone filtering provides the ability to conceal zones and make Network Visible Entities (NVE's) associated with the concealed zones invisible to nodes on selected internetwork branches in the AppleTalk Internetwork. Currently practiced zone filtering techniques in the context of an AppleTalk (trademark of Apple Computer, Inc.) internetwork are limited to preventing non-router devices within the internetwork from becoming aware of filtered zones. This prior art technique requires the establishment of zone filters within each of the custom routers throughout the internet branch of the internetwork.

A non-router device employs a "ZIP (Zone Information Protocol) GetZoneList request" in order to acquire a list of all zone names within the AppleTalk internetwork. This request is sent to any router on the directly connected network. The receiving router provides a "ZIP GetZoneList reply" comprised of all the zones on the internetwork. (The mechanics of ZIP GetZoneList requests and replies are known in the art, and briefly discussed subsequently.)

To filter out one or more zone names from the ZIP GetZoneList reply, the prior art technique relies upon the installation and maintenance of zone filters in each router within the internetwork branch to exclude zone names in the GetZoneList reply. This is the sole technique used by the prior art. As such, the prior art requires that, for an internetwork branch on the internetwork, each router supports zone filtering and contains the set of zone names in the filter for that branch.

Thus, in instances where an internetwork branch is partially comprised of a set of routers not supporting the installation of zone filters, the efficacy of zone filtering in the remaining routers is unpredictable since the GetZoneList request is sent to any router on the local network.

This prior art zone filtering technique does not provide zone filtering in response to ZIP Queries. The ZIP Query and associated ZIP Reply are typically performed by only routers, though non-router nodes may make ZIP Queries as well. When a first router determines that it is lacking a zone information for a corresponding network range, it sends a ZIP Query to a router identified in a routing table entry for the network range in question. A ZIP Reply provides the zones information requested.

The prior art filtering described above does not filter zone names from the ZIP Replies.

A first node may through external mechanisms have knowledge of a Network Visible Entity in a hidden zone (such as via an alias to a file on a file server which exists within a hidden zone). As a part of zone filtering, any NBP (Name Binding Protocol) BrRq's (Broadcast Requests) and NBP FwdReq's (Forward Requests) received by the router destined for a hidden zone need to be dropped. The result is that the Network Visible Entities that exist within hidden zones are invisible. This defeats the purpose of the NBP BrRq sent by the first node, so it is unable to discover the internetwork socket address of the file server.

NBP Replies are routed to the original requestor, and include the internetwork address of the NVE having the name sought. The prior art filtering technique previously described fails to filter NBP BrRqs or NBP FwdReqs to prevent the discovery of NVE's within filtered zones.

The prior art technique for providing zone filtering in an AppleTalk internetwork thus implicates high administrative overhead due to the need for the installation and maintenance of filters in each router within a internetwork branch. The prior art technique further requires that each router in the internetwork branch have support for zone filtering to work predictably. Additionally, the prior art technique is not comprehensive in that it fails to provide zone filtering in response to commands other than ZIP GetZoneList requests.

SUMMARY OF THE INVENTION

A zone filtering method and apparatus, finding particular utility in an AppleTalk (trademark of Apple Computing, Inc.) internetwork, is disclosed, with which a network administrator is able to restrict which zones are available to specific internetwork branches of the AppleTalk internet. By concealing zones and Network Visible Entities (NVE's) contained therein from the effected internetwork branches, nodes within these branches are unable to initiate communication to nodes that exist within the zones concealed from the internetwork branch.

The present invention is implemented through the use of a zone filter list associated with each port of the internetwork router.

The port identifies the internetwork branch subject to the associated zone filter. The zone filter list enumerates whether internetwork branch node access to the listed zones is either explicitly denied or permitted.

The nodes within the effected internetwork branch are unaware of the existence of the hidden zones and are unable to initiate communication with NVE's within the hidden zones. However, the effected nodes are able to respond to communication initiated by nodes within the hidden zones. This follows because zone filtering does not effect NBP reply or other datagrams.

The interpretation of the zone filter list depends in a first embodiment on an associated data element which provides an indication of whether the listed zones are used as either explicitly unrestricted (permitted) or explicitly restricted (denied). In an alternative embodiment, the filter list has a default interpretation of either explicitly unrestricted or explicitly restricted.

Routers operating according to the present invention are capable of recognizing certain datagrams which involve the transfer of zone name information, and in response determine the appropriateness of applying a port's zone filter to the datagrams. In an exemplary embodiment, these datagrams comprise: ZIP Query in which the appropriate filter is applied to the creation of the ZIP Reply; ZIP GetZoneList Request in which the appropriate filter is applied to the creation of the ZIP GetZoneList Response; and NBP BrRq and NBP FwdReq, in which the appropriate filter is applied to determine if the request should be discarded by the router.

By properly placing the zone filter within the internetwork, comprehensive zone filtering is achieved without the need to install and maintain the filter in all routers serving the effected internetwork branch, thus reducing management overhead. Further, the zone filtering of the present invention is comprehensive, in that all queries responsible for obtaining zone names on distant networks are subject to zone filtering, and NVE's within the hidden zones are invisible. In addition, not all routers in the internetwork need be routers which implement the presently disclosed zone filtering method and apparatus; as long as the desired location for the zone filter(s) is within a router according to the present invention, any other routers having the necessary operating characteristics are employable.

BRIEF DESCRIPTION OF THE DRAWINGS

These and other features, objects and benefits of the present invention are more fully set forth below in the detailed description of an illustrative embodiment and in the accompanying drawing of which.

DETAILED DESCRIPTION

Figure 1:
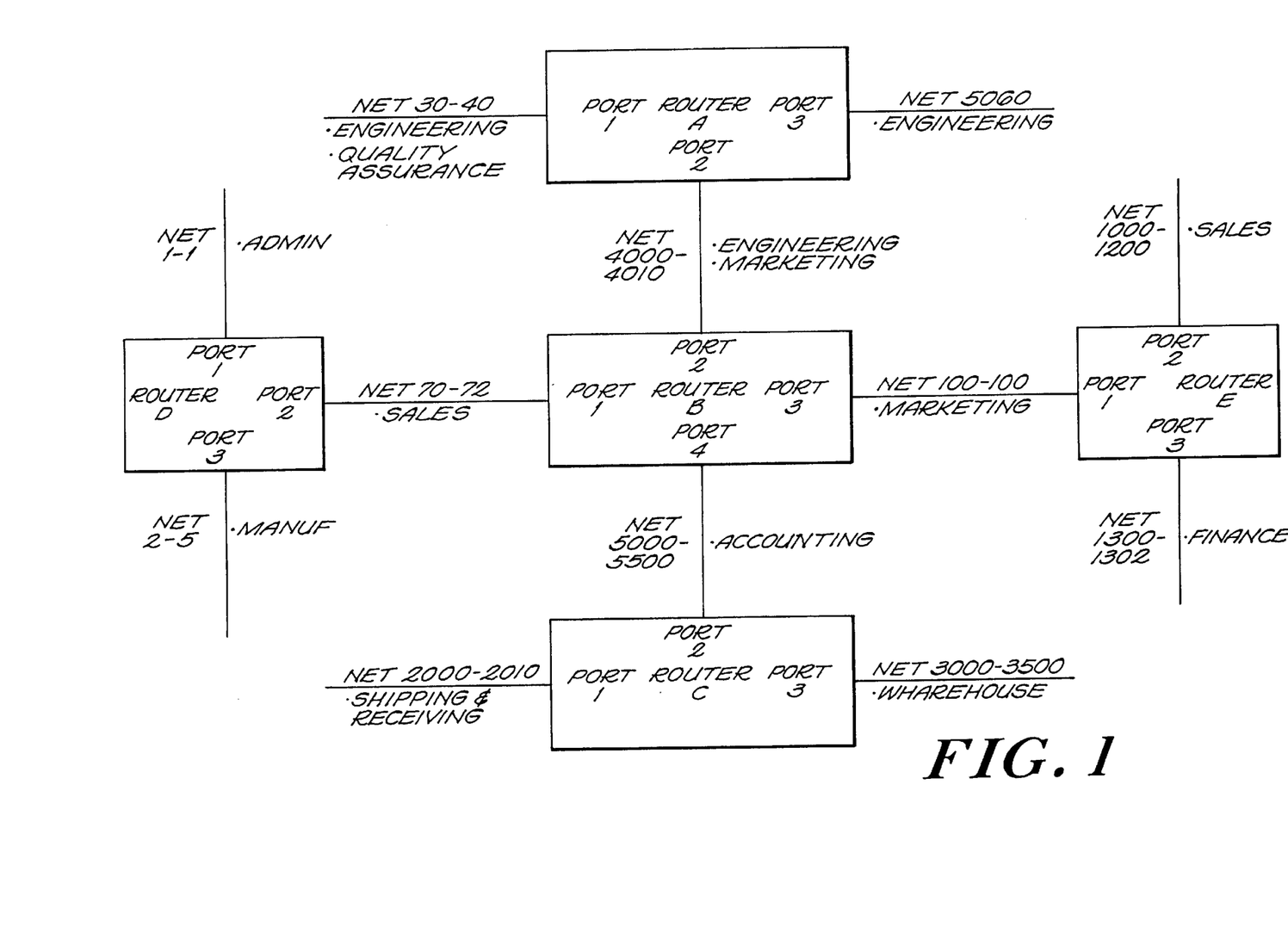
FIG. 1 is an exemplary AppleTalk internetwork topology in which the presently disclosed zone filtering apparatus and method are implementable.

An internetwork zone filtering method and apparatus are presently described in the context of an AppleTalk (trademark of Apple Computer, Inc.) internetwork. An exemplary AppleTalk internetwork is illustrated in FIG. 1 and provides a point of departure for a discussion of the operation of the present invention. Other fundamentals of such an internetwork are briefly described before a complete discussion of the present invention.

AppleTalk (TM) Internetwork Fundamentals

Five routers, labeled A, B, C, D, and E, are present in the illustrated internetwork. As known by one skilled in the art, a router is a device having multiple hardware ports, each for interfacing one of three elements: 1) an AppleTalk network; 2) a communications link (wherein the router is termed a half-router); or 3) a backbone network (wherein the router is termed a backbone router). In FIG. 1, each router is configured as having an AppleTalk network range at each router port, the latter being identified as "Port 1", "Port 2", etc.

In communication with each router port is a network range identified as "Net [x–y]", where [x–y] is a range of unique network numbers. For instance, Net 30–40 is connected to Router A, Port 1 (or more simply, port A-1). This net range includes network numbers 30 through 40.

Each network has associated with it at least one zone name.

Again with reference to port A-1, Net 30–40 is labeled as including zones "Engineering" and "Quality Assurance". Each node on each network is associated with only one zone, though a single zone can be spread over multiple networks. For instance, zone "Engineering"is also associated with Net 50–60 and with Net 4000–4010. The union of all zones is the internetwork.

Figure 2:
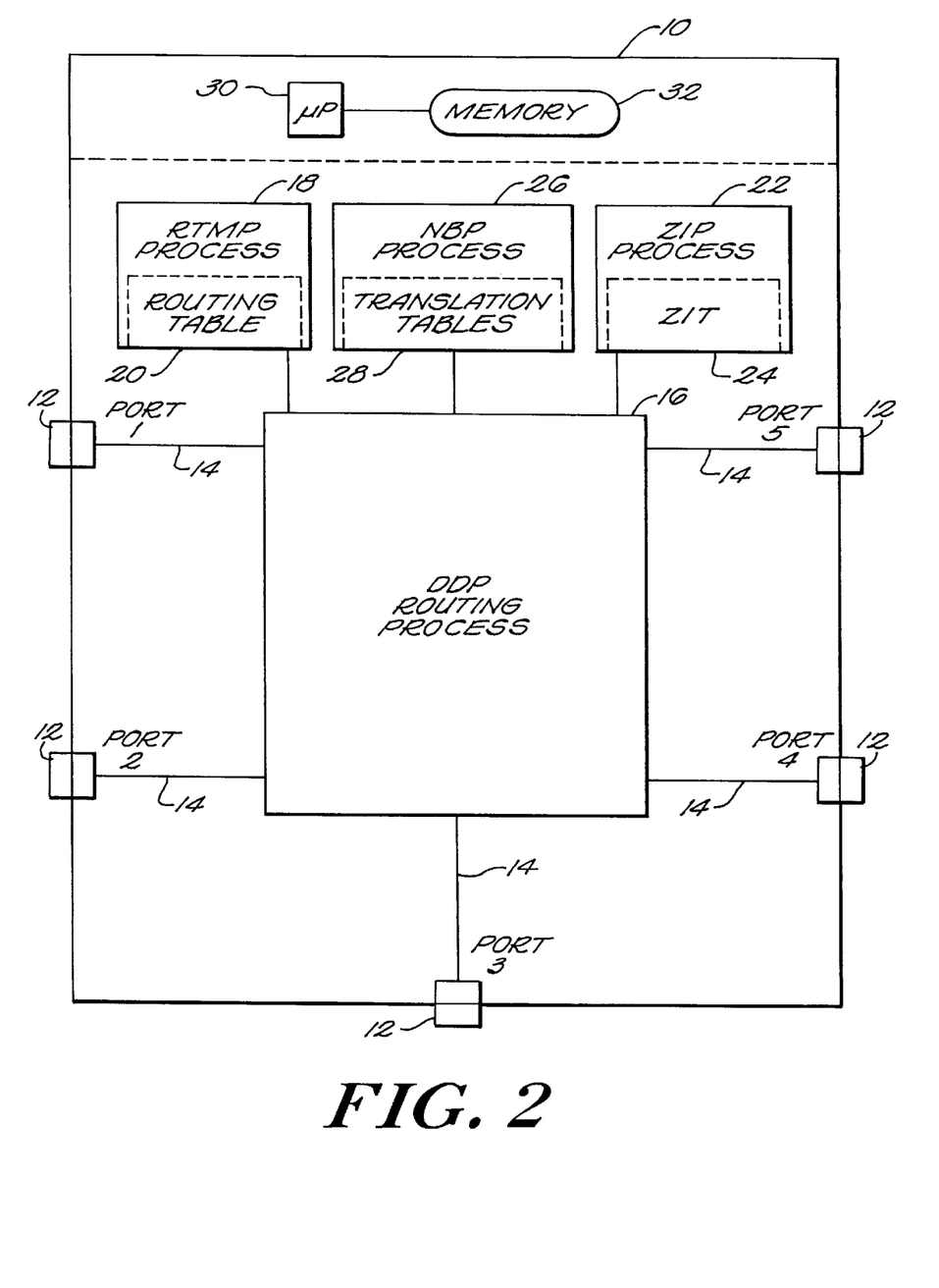
FIG. 2 is a block diagram of a router as used in the exemplary AppleTalk internetwork topology of FIG. 1.

Having described a typical internetwork topology, various elements of an exemplary router are described now with regard to FIG. 2. Since such routers are known in the art, only a brief description is presently given to the aspects most relevant to the presently claimed invention.

Each router 10 (also known as an internetwork router, or IR), provided with a plurality of ports 12, facilitates the store-and-forward delivery of datagrams between any two nodes in the internetwork. These ports 12 communicate via a respective data link 14 to a Datagram Delivery Protocol (DDP) routing process 16, the latter being responsible for socket-to-socket delivery of datagrams within the internetwork.

Associated with the DDP routing process 16 is a Routing Table Maintenance Protocol (RTMP) process 18. This process enables the dynamic maintenance of a routing table 20, such as that illustrated in FIG. 3, which is used by the DDP process 16 in routing datagrams. While there may be a number of paths which a datagram may take to arrive at a specified network range in a multiply connected internetwork, the RTMP process attempts to maintain, in the routing table, information regarding the shortest path. This is accomplished by regular RTMP exchanges of routing tables between adjoining routers. The table of FIG. 3 is a partial routing table 20 for router C.

Figure 3:
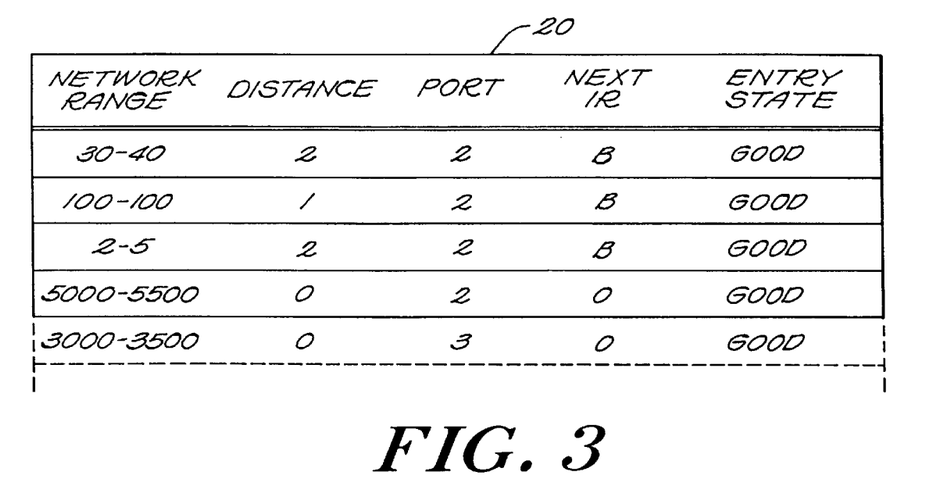
FIG. 3 is an exemplary routing table as maintained within one of the routers illustrated in FIG. 1.

The first entry of the routing table 20 of FIG. 3 specifies a "Network Range". The following entries define parameters necessary for the delivery of datagrams to a node within this range. The first Network Range entered in the table of FIG. 3 is Net 30–40.

The next entry is "Distance", measured in "hops", to the specified network range. Network ranges directly associated with the router in question have a distance of zero hops. The distance to Net 30–40 is two hops, a first through router B and a second through router A.

The third entry in the routing table is "Port", or the router port through which a datagram or other communication will be routed to get to the destination network number provided in the datagram itself. Network Range 30–40 is accessed via port 2 of router C.

The fourth entry in the table is "Next IR", or the next router which a communication for the specified network range will encounter. Such a communication for Network range 30–40 uses router B.

A fifth entry is for "Entry State", effectively reflecting the age and therefore the confidence in the routing information for this network range. Valid states include "Good", "Suspect", and "Bad".

Again with reference to FIG. 2, a Zone Information Protocol (ZIP) process 22 is also associated with the DDP process 16. The ZIP process 22 maintains an internetwork-wide mapping, in each router, of the network ranges to associated zone names. The mapping is referred to as a Zone Information Table (ZIT) 24 and in a first embodiment is implemented through a simple linked list.

Finally, the DDP process is associated with a Name Binding Protocol (NBP) process 26 which, by maintaining translation tables 28, provides the ability to translate user-discernible character string names into internetwork addresses.

Each router 10 is implemented in an illustrative embodiment as a minicomputer under the control of a microprocessor 30 having associated memory 32. The aforementioned processes are executed using this processor 30 and memory 32.

Figure 4:
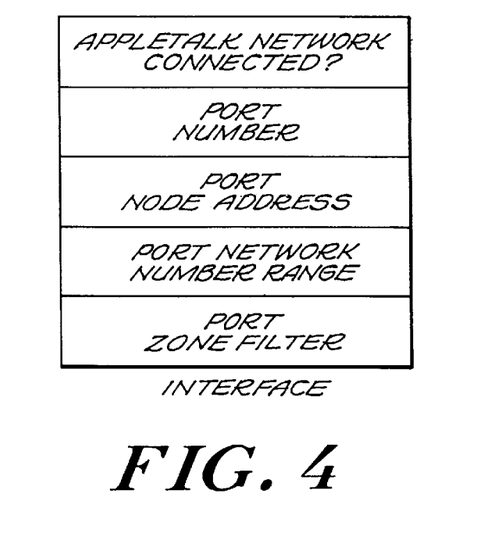
FIG. 4 is a partial, exemplary port data structure as maintained in association with each router port in the AppleTalk internetwork according to the present invention.

Further, the memory 32 is used to hold data structures, otherwise known as interfaces, associated with respective ones of the ports. Each such interface is comprised of information fields which describe the environment of the associated port. As illustrated in an exemplary interface for port C-1 shown in FIG. 4, interface entries as known in the art include: an indication whether the port interfaces directly to an AppleTalk network; the port number; a port node address comprising the network address of the router and the node ID of the port; and the network number range of the connected network.

Zone Filtering

In lieu of the interface provided by presently practiced systems, the presently claimed invention relies upon an interface comprising: an indication whether the port interfaces directly to an AppleTalk network; the port number; a port node address comprising the network address of the router and the node ID of the port; the network number range of the connected network; and a zone filter. The purpose of the zone filter is to enable a network manager to exclusively permit or deny nodes within an internetwork branch the knowledge that one or more zones exist elsewhere within the internetwork; it makes NVE's invisible to nodes within the affected internetwork branch. By doing so, the effected nodes are unable to initiate communication with NVE's within the filtered zones, though they are still capable of responding to communication initiated by a node within the filtered zones.

In a first embodiment, the zone filter contains a list of zone names and an indication of whether this filter is intended to permit or deny the transfer of the zone names on the list through the port to the associated internetwork branch. For instance, with regard again to FIG. 1 and to FIG. 4, if port C-1 has a zone filter containing the zone names "Engineering" and "Sales", and further containing an indication interpretable as "deny", the router will take certain action in response to datagrams which otherwise would provide nodes in the network range 2000–2010 with information regarding the zones Engineering and Sales.

If the same zone filter has the same zone names, but an indication interpretable as "permit", the router will take action in response to the operations which otherwise would provide network range 2000–2010 with information regarding zones other than Engineering, Sales and Shipping & Receiving. The specific operations on which the zone filters have effect are discussed subsequently.

In practice, a network manager establishes zone filters in various port interfaces via a zone filter sub menu at the manager's terminal. The appropriate command includes the port for which this filter applies, the list of zone names, and an indication of whether this list is intended to represent a list of zones exclusively denied or permitted. In a first embodiment, the default is to permit only those zone names listed, all others being filtered by the router. When configuring new filter lists, it is important to recognize that zone names to be filtered have already propagated throughout a functioning internetwork. It is therefore necessary to shut down the appropriate routers for a period of time so that existing ZITs are purged before configuring the zone lists and bringing the routers back up. New mechanisms for changing, adding, and deleting zone names may come into practice. The same technique could be used in an alternative embodiment of this invention to prevent the necessity for shutting down routers to age routing information.

ZIP Query and ZIP Reply

As previously described, each router maintains a Zone Information Table (ZIT) for binding one or more zone names to a network range. Routers learn dynamically about network ranges more than one hop away through regular RTMP routing table exchanges with neighboring routers. By doing so, a receiving router compares and updates the routing table stored within, based upon the received routing table information, to store the shortest path for each network range.

At least one seed router is found on each network. This seed router has the network number range and zone names already configured into the respective port interface. The RTMP process employs this interface information in constructing both routing table element and zone information table elements for each network. However, non-seed routers do not have this information pre-configured. These non-seed routers must rely upon other means to determine the network range information.

As the router learns of new network ranges through periodic RTMP broadcasts from neighboring routers, the routing table fills with corresponding routing table entries. The ZIP process concurrently observes that network ranges exist in the routing table which do not have corresponding entries in the ZIT. In response, the ZIP process is responsible for initiating requests to the Next-IR routers to learn the associated zone names.

A ZIP Query command, containing a list of network ranges in the ZIT having unidentified zone names, is issued at the behest of the ZIP process. The Query is directed to the appropriate router as determined from the routing table entry for the network range in the Query. The receiving router constructs a ZIP Reply containing the previously transmitted network ranges, along with the associated zone names.

As previously discussed, each port interface is provided with a zone filter field which enables a network manager to prevent nodes within an internetwork branch off the port from learning zone names which are to be filtered. Denying knowledge of zone names aids in the prevention of discovery of NVE's within the hidden zones by the affected nodes in the internetwork branch. Applying the zone filter means that the ZIP Reply may contain only those zones which are explicitly permitted by this interface and must not contain any of the zones which are explicitly denied by this interface.

One operation to which the filter must be applied is the ZIP Query which leads to the construction of a ZIP Reply, since the Reply provides a router with zone name information. With reference again to FIG. 1, assume for example that it is desired to keep devices in the internetwork branch connected to router A, port 2 from learning the zone name "Quality Assurance". The zone name "Quality Assurance" is entered in the zone filter of the interface for port A-2. Router B is brought up and learns of the network range 30–40 from the periodic RTMP broadcast of router A. Router B then issues a ZIP Query to router A in order to obtain the associated zone name information. When a ZIP Reply is being constructed by router A, the source network number of the ZIP Query is looked up in the routing table of router A to determine which port the ZIP Reply will issue from (port A-2). The interface for this port is referenced for the associated zone filter, which in this case contains the zone name "Quality Assurance", along with an indication that this zone name should be excluded.

For each network number in the ZIP Query, the list of zones is found in the Zone Information Table (ZIT). The zone filter is used in constructing the ZIP Reply. If the network number in the query is the first number in the network range of the associated port, and the destination network is zero hops away (directly connected), the zones associated with that network must not be filtered. Otherwise, the zone filter is applied.

If a zone name is found which is to be denied in the construction of the ZIP Reply, that zone name is not included in the ZIP Reply. For instance, in the above example, router A would not include the zone name "Quality Assurance" from the ZIP Reply for network range 30–40. Router B would then receive a ZIP Reply having an indication that the only zone name associated with net range 30–40 is "Engineering". No other network range replies would be affected by this filter.

In another example, assume both "Engineering" and "Quality Assurance" zone names have been denied. Due to the protocol, Router A must provide at least 1 zone name in the reply for that network range. Therefore, Router A, to satisfy this requirement, returns a placebo zone name. The placebo zone does not really exist, but is substituted in the reply when the reply would otherwise be empty for a particular network range. In a first implementation of the present invention, this name is "ZoneHiding".

Thus, zone names to be hidden from nodes which make a ZIP Query are prevented from propagating throughout the internetwork branch through the proper placement of zone filters in port interfaces.

ZIP GetZoneList Request and ZIP GetZoneList Reply

Non-router devices obtain a list of zones for the entire AppleTalk internetwork by making one or more ZIP GetZoneList Requests. In response, a receiving router provides a ZIP GetZoneList Reply, which contains all of the zone names in the ZIT of the router. As previously mentioned, each AppleTalk router maintains this list as part of the Zone Information Table (ZIT). This information is either obtained during router configuration (in a seed router), or is learned via ZIP Queries and Replies, as just discussed.

In some circumstances, it is desirable to prevent such a non-router device from learning of particular zone names. To prevent this from happening, each zone filtering router of the present invention does not include zone names which are to be filtered in the construction of the ZIP GetZoneList Reply.

By identifying the routing table entry for the source network number in the ZIP GetZoneList Request datagram, the router determines which port interface contains the appropriate zone filter for use in the construction of the ZIP GetZoneList Reply.

Applying the zone filter in this case means that the ZIP GetZoneList Reply may contain only those zones which are explicitly permitted by this interface, and must not contain any of the zones explicitly denied by the interface. However, zones which are considered Local Zones to this interface must not be filtered. Local Zones are zones which are associated with the network range defined by that interface. Therefore, even if all other zone names are to be filtered out, the router will still return a ZIP GetZoneList Reply having the Local Zone(s) in it.

In one implementation of the present invention, the placebo zone name ("ZoneHiding") should not be included in the returned list of zone names. The need for the placebo zone name does not arise in the ZIP GetZoneList Reply.

In another implementation of the present invention, each router recognizes the situation where zone information to be filtered at a port is not expected to be routed through that port in the first place. This would be the case if port C-2 of FIG. 1 had a zone filter entry excluding the zone "Sales". Router C may already have "Sales" in its ZIT, and may know (via its routing table) how to access it through router B. To avoid the provision of inconsistent results, router C will not filter the zone name "Sales" from the ZIP GetZoneList Reply which is sent out via port 2 to a node. However, if the ZIP GetZoneList Reply were to be sent out either port 1 or port 3, the zone name Sales would not be included in the reply.

NBP BrRq and NBP FwdReq

A network visible entity (NVE), identified by a name comprised of an Object string, a Type string, and a Zone string, is any entity that is accessible over the AppleTalk internetwork through the Datagram Delivery Protocol. Such an NVE is defined through an NBP registration process; the NBP process includes the maintenance of translation tables which facilitate the translation of the NVE name to its internetwork socket address.

A non-router device can request a socket address for a particular entity name by issuing an NBP BrRq (Broadcast Request). Included in this communication is one NBP tuple consisting of a name-address pair. The address is that of the requesting device, and the name is that of the entity whose address is sought. NBP Replies include tuples of both the internetwork address and name of the entity sought.

In prior art internetwork routers lacking zone filtering, a router receiving the NBP BrRq performs several operations. If the zone name in the NBP tuple exists on a network directly connected to the router, the router issues an NBP LkUp packet directed to the nodes in the target zone. The router also converts the NBP BrRq to an NBP FwdReq packet for each network that contains nodes in the target zone and forwards these NBP FwdReq packets to other routers.

Routers according to the present invention perform the same functions, yet only after the appropriate zone filter has been applied to the incoming NBP BrRq or FwdReq, if applicable. To prevent nodes from discovering NVE's that are in hidden zones, routers according to the present invention employ the interface zone filter of the port through which a reply to an NBP BrRq or NBP FwdReq is to be rotted. If the filter explicitly denies the zone specified in the packet, or if the zone filter does not explicitly permit the zone specified in the NBP packet, the router drops the NBP BrRq or NBP FwdReq. The exception is that if the NBP LkUp or NBP FwdReq were to be transmitted out the same port where the reply would be routed, then these datagrams must be sent.

In a first embodiment of the present invention, any NBP BrRq or NBP FwdReq containing the placebo zone name should be dropped before applying the appropriate interface filter.

It is possible for a zone to be filtered from a port in one direction, but not in another. For instance, assume port E-1 in FIG. 1 has zone "Sales" filtered. "Sales" is not filtered through router B. If a device within net 100—100 issues an NBP BrRq to router E for another device within "Sales", router E will not send a NBP LkUp out port 2, but will send the NBP FwdReq to router B.

Alternative embodiments to the foregoing disclosure include the application of the present filter method and apparatus to a variety of AppleTalk internetwork topologies. Further, it is feasible for the presently disclosed method and apparatus to find utility in internetwork environments other than AppleTalk, provided that these alternatives include nodes distributed among one or more zones, and in which zone identity is controllable via the installation of zone filters within routers.

In further embodiments of the presently invention, a router is capable of recognizing any operator other than those previously discussed which implicates the transfer of zone name information through an associated port, and applies the zone filter of the port to the information to be transferred in the operator.

In a first embodiment of the present application, software such as the following is used to implement the presently disclosed zone filtering technique.

```
/*
        It is assumed that a general purpose zone list structure is used throughout
        the implementation. We provide a simple linked list implementation for
        the purposes of illustration.
        Each routing table entry is expected to contain the list of zone names
        which correspond to the network number contained therin. Other mappings
        may be possible. Also a mapping from a network number to a port is
        required.
        Finally, the port structure needs to be expanded to contain a ZoneList
        which contains the configured list of zones for which a filter has been
        created, and a boolean indicating that the filter is being used for
        denying or permitting.
*/
#define kHiddenZone "Zone Hiding"
typedef struct
{
     void *next;
     char *zoneName;
}ZoneElement, *ZoneElementPtr;
typedef struct
{
   ZoneElementPtr head;
}ZoneList, *ZoneListPtr;
#define QGetHead(q) (void *) ((g)->head)
#define QGetNext(e) ((void *) ((QElementPtr(e)->next)
#define ForEachQueueElement(q,e) for(e = QGetHead(q) ;e;e = QGetNext(e))
#define ListEmpty(q) (q == 0)
/*
        External routines
        CompareCaseInsensitive compares two zone names the comparison is done
        in a case insensitive manner and diacritical sensitive. See
        Inside AppleTalk Second Edition Appendix D.
        malloc a standard C library call.
        strdup a standard C library call.
        free   a standard C library call.
        FindInRoutingTable returns the routing table entry which corresponds
                to a given network number.
*/
static Boolean ZoneOnList(ZoneListPtr zoneList,char *zoneName)
{
   ZoneListElementPtr zoneElement;
   ForEachQueueElement(&zoneLie,zoneElement)
   {
     if (CompareCaseInsensitive(zoneName, zoneElement->zoneName))
     {
       return(True);
     }
   }
   return(False);
}
static int AddZoneToList(ZoneListPtr zoneList,char *zoneName)
{
   ZoneListElementPtr newZoneElement;
   /* Get memory for a new ZoneList node. */
   newZoneElement = malloc(sizeof(ZoneListElement));
   if(newZoneElement)
   {
      newZoneElement->zoneName = strdup(zoneName):
      if(newZoneElement->zoneName)
      {
                  newZoneElement->next = zoneList->head:
                  zoneList->head = newZoneElement;
         return(1);
      }
            free(NewZoneElement);
   }
   return(0);
}
static int DeleteZoneFromList(ZoneListPtr zoneList,char *zoneName)
{
   ZoneListElementPtr zoneElement;
   ZoneListElementPtr pre = zoneList;
   ForEachQueueElement(&zoneList,zoneElement)
   {
     if(CompareCaseInsensitive(zoneElement->zoneName,zoneName))
     {
       pre->next = zoneElement->next;
       free(zoneElement->zoneName);
       free(zoneElement);
       return(1);
```

-continued

```
        }
        prev = zoneElement;
    }
    return(0);
}
/*
        FilterZipQueryReply alters the passed in zone list (which would be the unfiltered
        reply) to become the list of zones in a filtered reply.
        in any case, if the replyZoneList is empty when we are finished, we
        add the placebo zone which is sent as the reply.
*/
Boolean FilterZipQueryReply(int sourceNetwork, /* Datagram source network number */
ZoneListPtr replyZoneList)
{
        RoutingTableEntry rte;
        /*
            The route table entry for the source network number has the port through
            which the reply will be sent. Associated with that port is the zone
            filter.
        */
        rte = FindInRoutingTable(sourceNetwork);
        if(!rte)
        {
                return(False); /* No reply for this network number should be made at this
time */
        }
        FilterZonesFromList(replyZoneList,
e->port->zoneFilter,                                                                                rt
te->port->permit);                                                                                  |r
    if(ListEmpty(&replyZoneList)) /* We must have one zone */
    {
      Add ZoneToList(srcZoneList, KHiddenZone);
    }
        return(True);
}
/*
        FilterZonesFromList performs the following action:
        if deny is true, then we are to remove any zones which are on
        the filterList from the srcZoneList.
        otherwise deny is false (which means permit) then we are to remove
        any zones which are not on the filterList from the srcZoneList.
*/
static void FilterZonesFromList(ZoneListPtr srcZoneList,
ZoneListPtr filterList,
Boolean deny)
{
        if(!filterList)
    {
        return;
    }
    if(ListEmpty(&filterList)) /* A simple optimization */
    {
      if(deny)
      {
        return;
      }
      /* If we are permitting nothing, we'll add the hidden zone */
    }
    else
    {
      ZoneListElementPtr a ZoneElement;
      ForEachQueueElement(&srcZoneList,aZoneElement)
      {
        Boolean onList;
        onList = ZoneOnList(filterList, aZoneElement->zoneName);
        if(!(deny ^ onList})
        {
                DeleteZoneFromList(srcZoneList,aZoneElement->zoneName);
        }
      }
    }
}
/*
        Filtering ZipGetZoneList is somthing other vendors such as Cisco
        already perform.
*/
Boolean FilterZipGetZoneList(int sourceNetwork,ZoneListPtr replyZoneList)
{
        RoutingTableEntry rte;
        /*
```

```
            The route table entry for the source network number has the port through
            which the reply will be sent. Associated with that port is the zone
            filter.
       */
       rte = FindInRoutingTable(sourceNetwork);
       if(!rte)
       {
            return(False); /* Reply cannot be made */
       }
       FilterZonesFromList(replyZoneList,
e->port->zoneFilter,                                                                    rt
te->port->permit);                                                                      |r
       /* Make sure placebo zone is not returned to requestor */
       DeleteZoneFromList(replyZoneList,kHiddenZone);
       return(True);
/*
       For processing of NBP BrRq and NBP FwdReq's. The sourceNetwork is the
       network number of device making the request. zoneName is the zone
       which is in the requested NBP Tuple.
       False is returned if the request is to be dropped, True is returned
       if the request passes the filter.
*/
Boolean FilterNBPRBrRqAndFwdReq(int sourceNetwork,char *zoneName)
{
       RoutingTableEntry rte;
       if(CompareCaseInsensitive(zoneName,kHiddenZone))
       {
            return(False); /* Drop the request */
       }
       rte = FindInRoutingTable(source.networkNumber);
       if(!rte)
       {
            return(False);
       }
       if(rte->port->permit != ZoneOnList(&rte->zoneFilter,zoneName))
       {
            if(!ZoneOnList(&rte->zoneList,zoneName))
            {
                return(False);
            }
            /* Allow devices to look in local zones */
       }
       return(True);
}
```

Having described preferred embodiments of the invention, it will be apparent to those skilled in the art that other embodiments incorporating the concepts may be used. These and other examples of the invention illustrated above are intended by way of example and the actual scope of the invention is to be determined from the following claims.

What is claimed is:

1. A method for filtering zone names at an internetwork router associated with an internetwork, said method comprising:

receiving a request for a zone name information response, for a specified network address range, from a requesting node associated with said internetwork, at a receiving port of said router;

identifying, by said router, a response port through which said zone name information response is to be provided;

referring to a port descriptor associated with said response port, by said router, to determine which zone names are to be filtered from the response provided through said response port, said port descriptor providing a zone name filter specifically configured for selectively filtering zone name information responses provided through said respective response port, wherein each of plural port descriptors may provide a unique zone name filter;

removing, by said router, said zone names to be filtered from said zone name information response according to said port descriptor; and substituting placebo zone names to be associated with said specified network range for said zone names to be filtered in said zone name information response if all zone names have been removed from said information response.

2. The method according to claim 1, wherein said step of receiving a zone list request comprises receiving a ZIP Query at said receiving port.

3. The method according to claim 1, wherein said step of referring to a port descriptor further comprises looking up a list of zone names to be filtered located within said port descriptor.

4. The method according to claim 1, wherein said step of referring to a port descriptor further comprises looking up a list of zones names not to be filtered located within said port descriptor.

5. The method according to claim 1, wherein said step of removing said zone names to be filtered further comprises removing said zone names to be filtered from a ZIP Reply.

6. A zone filtering intelligent node disposed in an internetwork comprised of a plurality of network ranges, said intelligent node comprising:

a plurality of ports, each in communication with at least one of said network ranges;

a data routing element in communication with said plurality of ports for receiving a request, from a requesting node associated with said internetwork, for a zone name information response for a specified network address range, for identifying one of said plurality of sorts as a response port, and for directing said zone name information response to said response port;

a programmable control unit and associated memory, said programmable control unit for controlling said data routing element and for compiling said zone name information response; and a plurality of zone name information filters, each associated with a respective one of said plurality of ports and selectively applied by said programmable control unit to said zone name information response directed through said respective port by said data routing element, wherein each of said zone name information filters is customized for the respective one of said plurality of ports and may be unique among all of said zone name information filters, wherein, for each zone name information response, said programmable control unit removes zone names to be filtered from said response according to said zone name information filter associated with said response port, and wherein said zone name information response comprises a placebo zone name, inserted into said zone name information response by said programmable control unit, if said zone name information response would otherwise contain only zone names to be filtered based upon said response port-associated zone name information filter.

7. The intelligent node according to claim 6, wherein said zone name information request is a ZIP Query and said zone name information response is a ZIP Reply.

8. The intelligent node according to claim 6, wherein each of said plurality of zone name information filters is comprised of a zone list and an associated data element providing an indication of whether said zone list includes zone names to be permitted or denied in said zone name information response.

* * * * *

UNITED STATES PATENT AND TRADEMARK OFFICE
CERTIFICATE OF CORRECTION

PATENT NO. : 5,845,087
DATED : December 1, 1998
INVENTOR(S) : Eric M. Trehus

It is certified that error appears in the above-identified patent and that said Letters Patent is hereby corrected as shown below:

Column 8, line 29, "rotted" should be --routed--

Column 15 (claim 14), line 1 "sorts" should be --ports--

Signed and Sealed this

Twenty-seventh Day of February, 2001

Attest:

NICHOLAS P. GODICI

Attesting Officer  Acting Director of the United States Patent and Trademark Office